Figure 1:
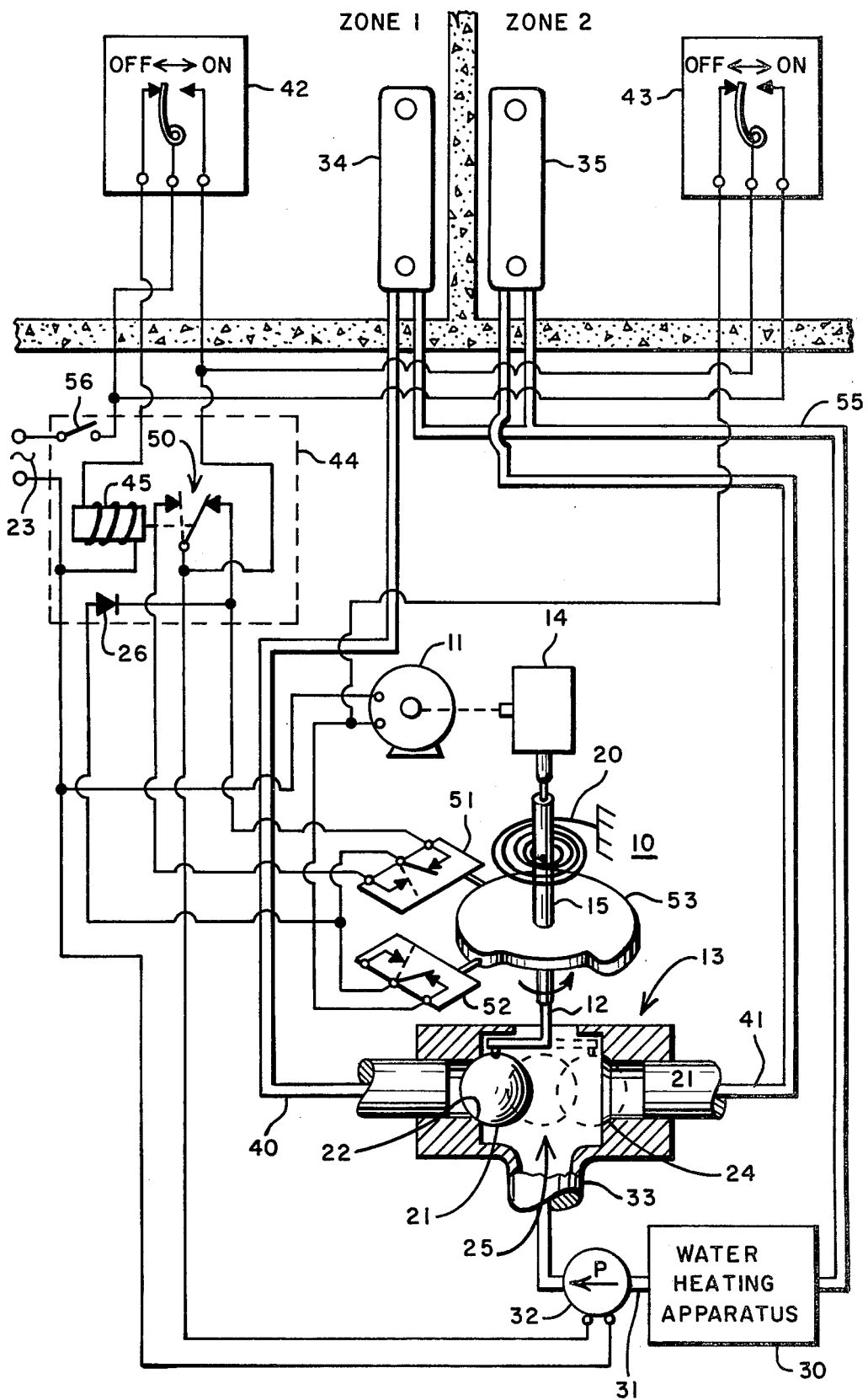

United States Patent [19]
Carson

[11] 3,974,427
[45] Aug. 10, 1976

[54] MOTOR CONTROL APPARATUS FOR THREE POSITION VALVE

[75] Inventor: Kenneth G. Carson, Newmarket, Canada

[73] Assignee: Honeywell Inc., Minneapolis, Minn.

[22] Filed: Nov. 7, 1974

[21] Appl. No.: 521,611

[30] Foreign Application Priority Data
Feb. 28, 1974  Canada.........................193696

[52] U.S. Cl................................ 236/1 C; 318/160; 237/8 R
[51] Int. Cl.²...................... G05B 11/06; H02P 3/18
[58] Field of Search .......... 318/160, 212, 168, 169, 318/543, 544, 549, 436; 236/1 C; 237/8 R

[56] References Cited
UNITED STATES PATENTS

| | | | |
|---|---|---|---|
| 2,119,205 | 5/1938 | Doyle et al. ........................ | 318/168 |
| 2,411,051 | 11/1946 | Mesh .............................. | 318/169 X |
| 2,586,095 | 2/1952 | Roters............................. | 318/169 X |
| 3,384,800 | 5/1968 | Norris et al...................... | 318/160 X |
| 3,633,082 | 1/1972 | Hasegawa et al.................. | 318/212 |
| 3,743,182 | 7/1973 | Harmon et al.................... | 318/160 X |

Primary Examiner—B. Dobeck
Attorney, Agent, or Firm—Clyde C. Blinn; Henry L. Hanson

[57] ABSTRACT

A motor control apparatus having an electric motor which is driven in one direction by an alternating current power source and in a return direction by a spring return wherein a holding or braking of the motor is accomplished by the application of a source of direct current power to magnetize the motor and hold it in a predetermined intermediate position after the removal of the alternating current power source. The braking or holding action is removed by taking away the direct current power source and momentarily applying an alternating current power source to the motor to demagnetize or degauss the motor so it is free to return to its initial condition under the power of the spring return. The motor control apparatus is particularly adapted for use to control a three position water valve supplying water to two different areas or zones as required by zone thermostats to have water supplied to one or the other of the zones or both of the zones depending upon the demand by the thermostats and the position of the motorized valve.

7 Claims, 3 Drawing Figures

MOTOR CONTROL APPARATUS FOR THREE POSITION VALVE

BACKGROUND AND SUMMARY OF THE INVENTION

For many years motor control apparatus for controlling valves have contained motors which are energized in one direction by a source of power, returned to the initial position by a spring return and held in some predetermined position by a braking means. Such motor control apparatus is shown in the United States Nelson T. Branche patent 2,052,918 issued Sept. 1, 1936. While the Branche patent discloses a mechanical brake, the use of electrical brakes by applying a direct current source of power to the motor winding is old and is shown in one form in the United States Jean Marie Girard U.S. Pat. 2,434,919 issued Jan. 27, 1948.

The present invention is concerned with a motor control apparatus making use of small inexpensive synchronous inexpensive alternating current powered motors for driving a load through a large ratio gear train by being powered with an alternating current power source to operate the motor in one direction and a spring return to operate the motor in the other direction. A direct current power source is applied to the motor for braking the motor in some predetermined position intermediate its initial and end positions. When a direct current power source is applied to such motors, a permanent magnetization effect takes place so that even though the direct current power source is removed, the braking or holding action remains and the motor may not return to the initial position under the spring return. If a momentary alternating current power source is applied to the motor to demagnetize or deguass the motor, the motor is assured of beingfreed to rotate and can return to the initial position under the spring return.

Figure 2:
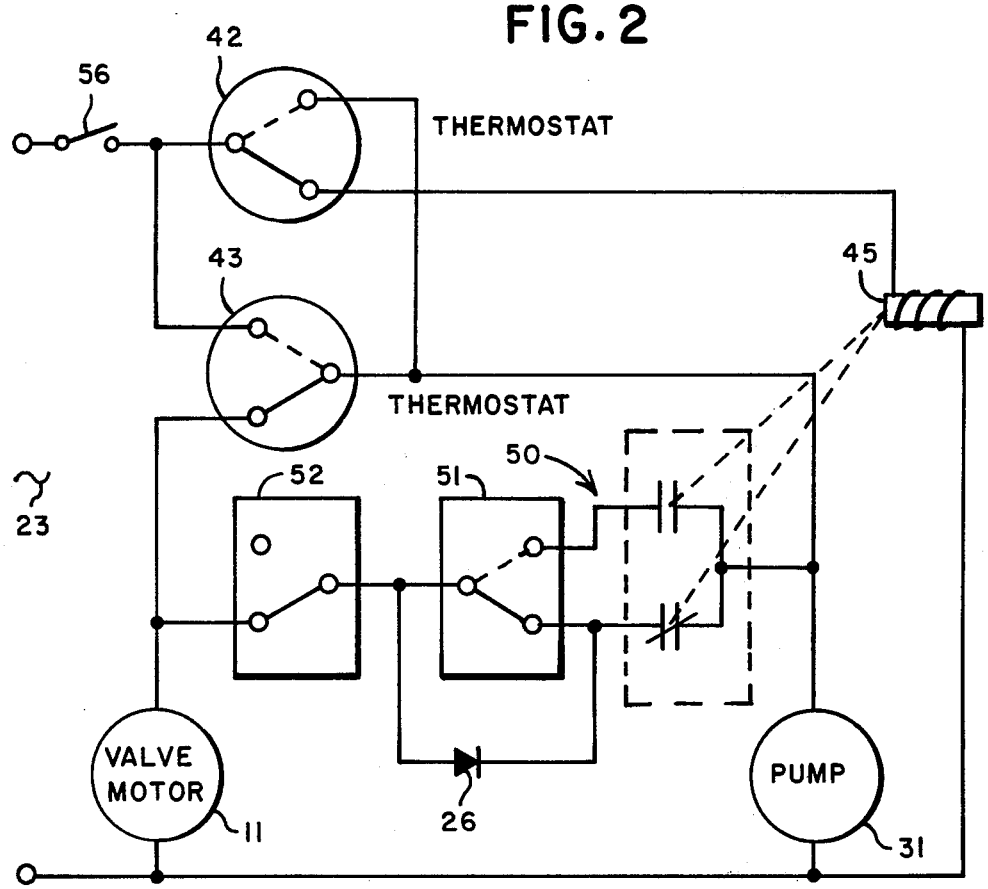
Figure 3:
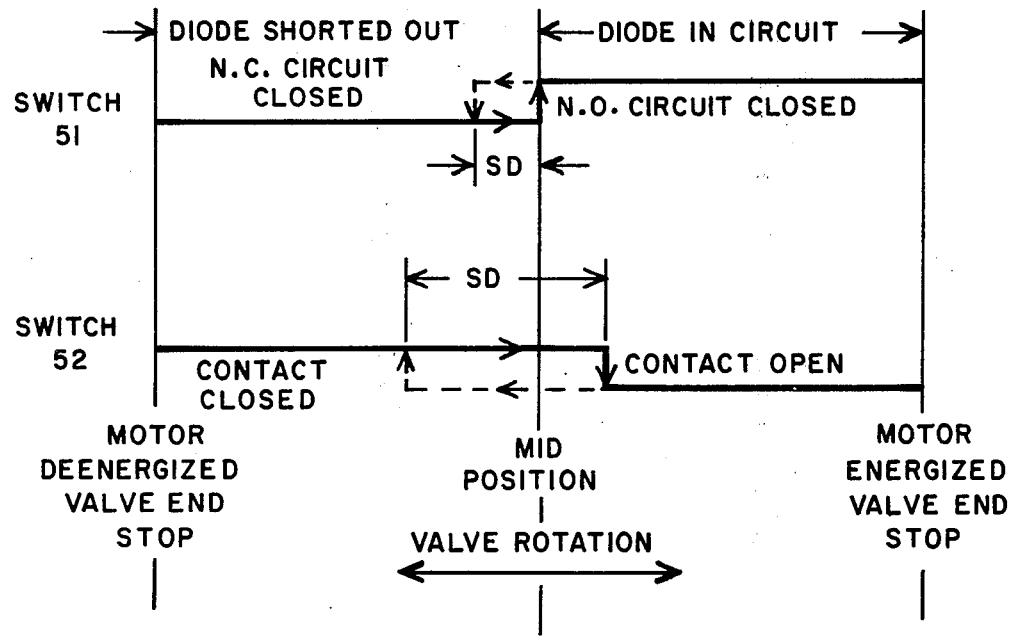

The invention is disclosed in the drawing having;

FIG. 1 is a schematic showing of a motor control apparatus for controlling a three position valve supplying hot water to two zones, FIG. 2 is a detailed circuit of the system of FIG. 1, and FIG. 3 is a graphical representation of the switching circuit operation associated with the motor.

DESCRIPTION OF THE INVENTION

Referring to FIG. 1 a motor control apparatus 10 has a conventional, small, inexpensive, synchronous alternating current electric motor 11 such as used in clocks, timers and other motor driven apparatus wherein a large ratio gear train is needed to provide the mechanical advantage to the motor for driving the load. The motor is connected to an operator 12 of a three position water valve 13 through a mechanical output including a reduction gear train or apparatus 14 and a shaft 15. Connected to shaft 15 is a coiled return spring 20 adapted to bias shaft 15 and motor 11 in a clockwise direction (opposite the direction shown by an arrow) to hold a valve member 21 in a valve end or initial position against a valve seat 22. Upon the energization of motor 11 from an alternating current source 23, shaft 15 is rotated counterclockwise (direction shown by the arrow) to move valve member 21 from the initial end position to an opposite end position shown in dotted lines against another valve seat 24. A mid-position 25 of valve member 21 is accomplished by holding or braking the motor in a predetermined position intermediate the initial and end positions by the application of a direct current voltage source of power obtained from a unidirectional current conducting device or diode 26. The direct current magnetizes the motor poles and the motor is held in position. The magnetization of the motor poles can remain after the direct current is terminated and the motor may not move under the power of the return spring. For this reason, a circuit, to be described, is provided to momentarily energize the motor with alternating current to demagnetize the motor when the braking is to be removed to insure that the return spring can move the motor in the return direction. of the Valve 13 is connected in a conventional water heating system supplying heat to zones 1 and 2. Specifically the water is heated by a temperature conditioning or heating apparatus 30 connected in a supply line 31 containing a pump 32 to supply heated water to an inlet 33 of valve 13. Depending upon the position of valve member 21, the hot water is supplied to either or both of the heat exchangers 34 and 35 in the zones 1 and 2, respectively, through supply pipes 40 and 41 connected to the outlets of valve 13 associated with valve seats 22 and 24, respectively.

Zones 1 and 2 each have a temperature responsive apparatus or thermostat 42 and 43 having a single pole double throw switch controlled by a temperature responsive sensor or bimetal. The thermostats are connected to a panel 44 containing a relay 45 having single pole double throw switch contacts 50. As shown relay 45 is de-energized.

Associated with motor control apparatus 10 are a pair of conventional snap switches 51 and 52 containing single pole double throw switches which are operated when an associated push button is moved by a cam member 53 attached to shaft 15. By so arranging switches 51 and 52, the operation of the switches is such that a normally closed circuit of switch 51 opens before a circuit of switch 52 opens near a mid position of valve member 25 when the motor is energized in a forward direction. A normally closed circuit of switch 51 closes before the circuit of switch 52 closes when the motor is driven in a return direction under the power of the return spring 20. Switches 51 and 52 have an overlapping operation. The specific operation of switches 51 and 52 is shown in the representation of FIG. 3.

OPERATION OF THE INVENTION

As shown in FIG. 1, the motor control apparatus is de-energized and the thermostats 42 and 43 of the zones are satisfied. Motor 11 is held in its initial end position by return spring 20 and valve member 21 is against valve seat 22. Pump motor 32 is de-energized. In this circuit condition with a main switch 56 closed alternating current power is supplied from source 23 to relay 45 but its energization serves no purpose.

Upon a call for heat demand in zone 1 by the bimetal of thermostat 42 cooling and moving the contact to the right against the on contact, shown either in FIG. 1 or FIG. 2, pump 32 is energized to begin the circulation of water to valve 13 from water heating apparatus 30. Relay 45 is de-energized and valve motor 11 is energized from source 23 through the off contact of thermostat 43. Valve member 21 slowly moves to the extreme right from the position shown to open the valve and allow hot water to be supplied to zone 1 through pipe 40 and stop the flow of water to zone 2. The used water returns through pipe 55 to the water heating apparatus 30. When zone 1 is satisfied, thermostat 42 opens its on circuit and motor 11 returns under the power of the spring to the initial position and the pump stops.

Assume that zones 1 and 2 both have a heat demand and the bimetals of thermostats 42 and 43 cool and move the contacts to the on position, pump 32 is energized. Relay 45 is de-energized. As motor 11 is energized from source 23 via circuit through switches 51 and 52, valve member 21 moves to the right and cam 53 moves counterclockwise (in the direction of the arrow) until switch 51 is operated when valve member 21 is in the midposition. Upon the operation of switch 51, diode 26 is placed in the circuit to rectify the alternating current to apply a direct current braking or holding voltage to motor 11 which magnetizes the motor and holds the motor in a predetermined position regardless of the force of return spring 20. With no change in the conditions of the zone thermostats 42 and 43, the motor will remain in a position to maintain valve member 21 in the mid-position 25 and hot water is supplied through both pipes 40 and 41 to the zones to return to the water heating apparatus over the return pipe 55. Should the zone 1 thermostat become satisfied and zone 2 remain unsatisfied, so the motor output returns to the initial end position, a circuit established through switch 52 and the normally open circuit of switch 51 is used when relay 45 is again energized to connect motor 11 to the alternating current source of power 23 to temporarily energize the motor in a forward direction to de-magnetize or deguass the motor to remove any permanent magnetization due to the direct current braking power. When cam 53 moves the operating button of switch 52, switch 52 opens the alternating current energization circuit, motor 11 is de-energized and spring 23 drives the motor back to its initial position to place the valve member 21 on seat 22. The flow of hot water to zone 2 is continued. If the heat demand in zone 2 is satisfied thermostat 43 moves to the off position to de-energize pump 32.

Assume that zone 2 becomes satisfied while zones 1 and 2 are calling for a heat demand. Thermostat 43 moves to an off position, however, the pump 31 remains energized through the thermostat 42. Valve motor 11 which was previously held in the mid-position by the direct current braking action in now energized through thermostat 42 and thermostat 43 (when in the off position) directly from the alternating current source 23 and the motor is driven to its extreme end position to move valve member 21 against seat 24 blocking the flow of hot water to zone 2. Should zone 2 again have a heat demand the energization circuit through the off position of thermostat 43 is broken and motor 11 returns by the return spring toward the mid-position until switch 51 operates by cam 53 to close the normally closed contact and switch 52 closes to again energize the motor driving it in a forward direction until switch 51 operates to place diode 26 in series with the motor and brake the motor in the mid-position.

In the condition when both zones are having a heat demand and the motor has placed valve member 21 in mid-position, if both thermostats simultaneously become satisfied and turn off, the valve may stay in the mid-position; however, as pump motor 31 is then de-energized, no hot water is supplied to either zone. The system, upon a call for heat by either of the zones, would then return to the type of operation as previously mentioned.

The embodiments of the invention in which an exclusive property or right is claimed are defined as follows:

1. A motor control apparatus comprising:
   an electric motor means havng output means, said motor means having the characteristic that its output means is held by residual magnetism of said motor means after the application and then removal of a direct current power source,
   an alternating current power source,
   circuit means connecting said alternating current power source to said motor means to energize said motor means in one direction to drive said output means to a position between an initial position and an end position,
   spring return means connected to said motor means for driving said motor means in the other direction when said motor means is not being energized by said alternating current power source,
   a source of direct current power,
   circuit means for connecting said source of direct current power to said motor means to magnetize said motor means to brake said motor means and hold said output means in a predetermined position intermediate said initial and said end positions when said alternating current power source driving said motor means in said one direction is removed,
   and further circuit means for temporarily energizing said motor means with alternating current power to demagnetize said motor means to remove any residual magnetism when said output means is to return toward said initial position under the power of said spring return means.

2. The invention of claim 1 wherein,
   said further circuit means comprises switching circuit means operably connected to said motor means to energize said motor means for a small increment of movement in said one direction from said alternating current source of power to de-magnetize said motor means.

3. The invention of claim 1 wherein
   said electric motor means is adapted to be connected to drive a three position water valve for controlling the supply of water from a water temperature conditioning source to a first zone when said motor is in said initial position, to said first and a second zone when said motor means is in an intermediate position and to said second zone when said motor is in said end position and
   said circuit means comprises a first thermostat adapted to respond to the temperature in a first zone and a second thermostat adapted to respond to the temperature in a second zone, wherein upon the need for a change in the temperature in said first zone and said second zone said thermostats are adapted to control the flow of temperature conditioned water to said zones upon the energization of a water pumping means.

4. The invention of claim 3 wherein
   said further circuit means comprises relay means adapted to be energized when one of said thermostats is satisfied, said relay means comprising normally open and normally closed sets of contacts, and
   comprising switch means connected to said output means, said switch means comprising two separate switches operating near said intermediate position of said output means, a first of said switches changing its circuit before a second of said switches changes its circuit as said output means moves in said one direction and said first of said switches changing its circuit before said second of said switches changes its circuit as said output means moves in said other direction, and circuit means including said first and second of said switches and said first and second set of contacts of said relay means for connecting a unidirectional circuit conducting device in series with said source of alternating current power to provide a said source of direct current power to brake said motor means in said predetermined position when both of said thermostats call for a need of conditioned water to said zones, and for removing said unidirectional current conducting device from said circuit to apply said alternating current power to said motor upon said thermostat of said first zone calling for conditioned water to de-magnetize said motor whereby upon said circuit means including said switches opening said motor means returns to its initial position by its spring return.

5. The invention of claim 2 wherein
said switching circuit means comprises
a first and a second switch means operably controlled by said output means,
relay means,
circuit means including said switch means and said relay means for connecting a unidirectional current conducting device to said alternating current source of power to supply said direct current power to hold said motor, said circuit means providing for energization of said motor means with said alternating current source to de-magnetize said motor after said direct current power is removed.

6. The invention of claim 5 wherein
said first switch means has a narrower switching differential than said second switch means whereby upon the operation of said switch means by said output means, said first switch means is first to operate in either direction of rotation of said output means to have an overlapping operation with respect to said second switch means.

7. The invention of claim 4 wherein,
said circuit means connects said second switch, a portion of said first switch which is closed when said motor is in its initial end position, and one of said set of contacts of relay means which are normally closed in a series circuit and said unidirectional current conducting device in parallel with said closed portion of said first switch to provide an alternating current supply source to said motor means, and
said circuit means further connects said second switch, a second portion of said first switch which is open when said motor is in its initial position, and a second set of contacts of said relay means which are normally open in a series circuit,
said first switch means upon operating to open said first portion provides for the supply of rectified current to said motor through said unidirectional current conducting device to brake said motor means.

* * * * *